US011919201B2

United States Patent
Kroiss

(10) Patent No.: US 11,919,201 B2
(45) Date of Patent: Mar. 5, 2024

(54) PROCESSING PLANT AND METHOD FOR PROCESSING PLASTICS MATERIAL FOR THE RECYCLING THEREOF

(71) Applicant: Next Generation Recyclingmaschinen GmbH, Feldkirchen an der Donau (AT)

(72) Inventor: Guenter Kroiss, Hartkirchen (AT)

(73) Assignee: Next Generation Recyclingmaschinen GmbH, Feldkirchen an der Donau (AT)

(*) Notice: Subject to any disclaimer, the term of this patent is extended or adjusted under 35 U.S.C. 154(b) by 244 days.

(21) Appl. No.: 17/291,708

(22) PCT Filed: Dec. 6, 2019

(86) PCT No.: PCT/AT2019/060417
§ 371 (c)(1),
(2) Date: May 6, 2021

(87) PCT Pub. No.: WO2020/124110
PCT Pub. Date: Jun. 25, 2020

(65) Prior Publication Data
US 2022/0001579 A1  Jan. 6, 2022

(30) Foreign Application Priority Data
Dec. 19, 2018 (AT) .............................. A 51131/2018

(51) Int. Cl.
*B29B 7/42* (2006.01)
*B29B 7/88* (2006.01)
(Continued)

(52) U.S. Cl.
CPC .............. *B29B 7/426* (2013.01); *B29B 7/885* (2013.01); *B29B 17/00* (2013.01);
(Continued)

(58) Field of Classification Search
None
See application file for complete search history.

(56) References Cited

U.S. PATENT DOCUMENTS 3,595,533 A  7/1971 Sutter
3,869,111 A  3/1975 Matsuoka
(Continued)

FOREIGN PATENT DOCUMENTS

AT  413 512 B  3/2006
AT  517 972 A1  6/2017
(Continued)

OTHER PUBLICATIONS

International Search Report in PCT/AT2019/060417, dated Feb. 24, 2020.

*Primary Examiner* — Benjamin A Schiffman
(74) *Attorney, Agent, or Firm* — Collard & Roe, P.C.

(57) ABSTRACT

The invention relates to a method and a processing plant (1) for plastic material, for the recycling thereof. To this end, the processing plant (1) comprises a feed device (4), a processing unit (2) having a comminuting device (5) and a conveying device (6) adjoining the comminuting device (5), and an extrusion device (3) having an extruder screw (21). During its conveying movement along a first conveying section (9) toward a transfer region (8) by means of the conveying device (6), the comminuted plastic material is heated to a transfer temperature with a mean temperature value, which falls into the range of the softening temperature of the plastic material. In the transfer region (8), the comminuted plastic material is transferred to the extrusion device (3).

5 Claims, 3 Drawing Sheets

Figure 1:
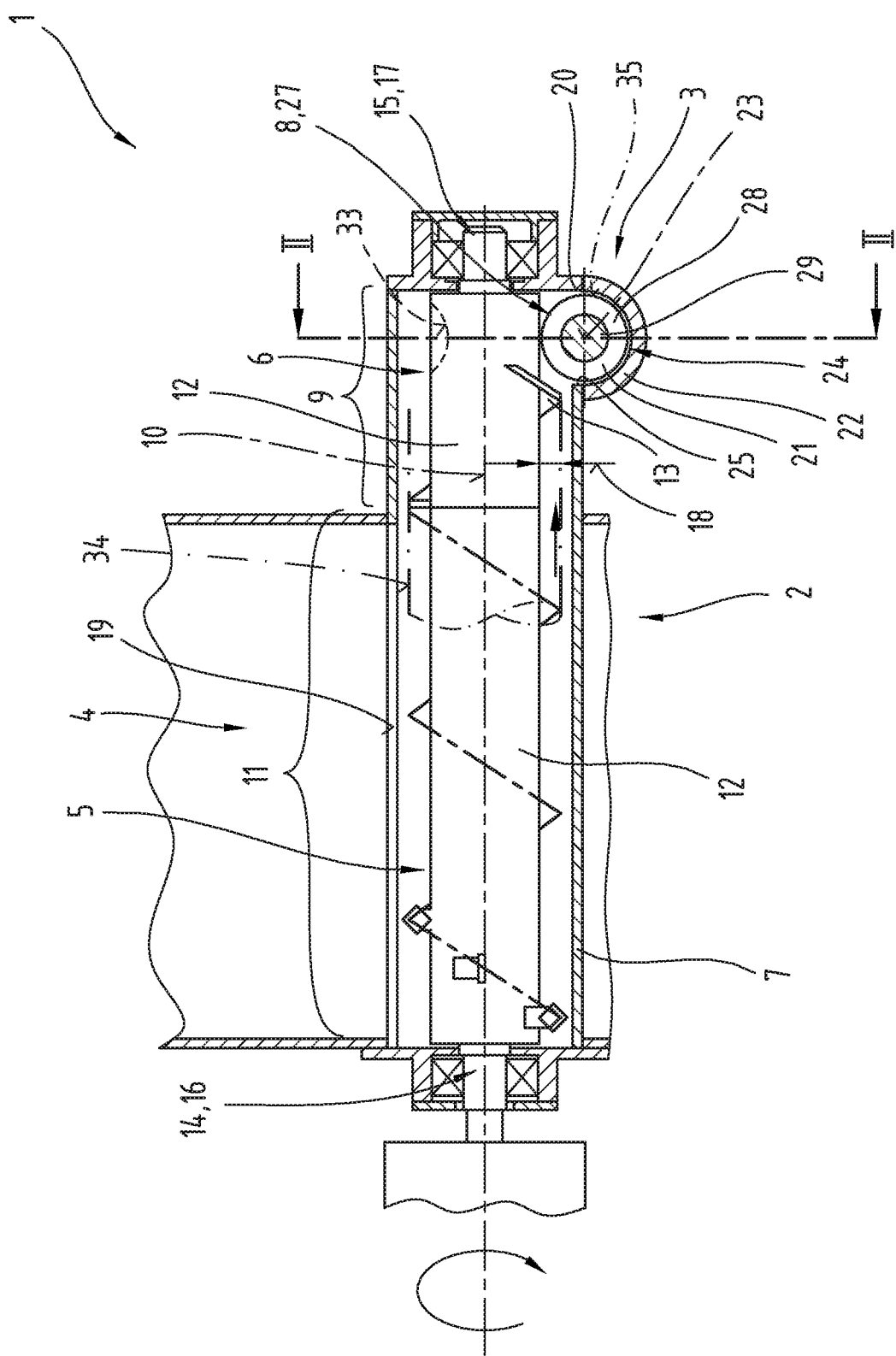

(51) Int. Cl.
*B29B 17/00* (2006.01)
*B29B 17/04* (2006.01)
*B29C 48/275* (2019.01)
*B29C 48/385* (2019.01)
*B29C 48/505* (2019.01)
*B29C 48/84* (2019.01)

(52) U.S. Cl.
CPC .......... *B29B 17/0026* (2013.01); *B29B 17/04* (2013.01); *B29C 48/277* (2019.02); *B29C 48/385* (2019.02); *B29C 48/507* (2019.02); *B29C 48/845* (2019.02)

(56) References Cited

U.S. PATENT DOCUMENTS

| | | | |
|---|---|---|---|
| 6,126,100 | A | 10/2000 | Barth et al. |
| 7,309,224 | B2 | 12/2007 | Bacher et al. |
| 8,419,997 | B2 | 4/2013 | Hackl et al. |
| 9,221,198 | B2 | 12/2015 | Feichtinger et al. |
| 9,713,883 | B2 | 7/2017 | Vainer |
| 10,792,672 | B2 | 10/2020 | Brzezowsky et al. |
| 2008/0175940 | A1 | 7/2008 | Barth et al. |
| 2013/0113139 | A1 | 5/2013 | Weigerstorfer et al. |
| 2018/0147747 | A1 | 5/2018 | Brzezowsky et al. |
| 2018/0369770 | A1 | 12/2018 | Brzezowsky et al. |

FOREIGN PATENT DOCUMENTS

| | | |
|---|---|---|
| CH | 450696 A1 | 1/1968 |
| CN | 2905411 Y | 5/2007 |
| CN | 104507653 A | 4/2015 |
| CN | 105856457 A | 8/2016 |
| CN | 107471481 A | 12/2017 |
| CN | 107848147 A | 3/2018 |
| CN | 108025458 A | 5/2018 |
| DE | 24 57 546 A1 | 6/1975 |
| DE | 35 25 554 A1 | 2/1986 |
| DE | 197 14 944 A | 4/1998 |
| DE | 101 40 215 A1 | 2/2003 |
| EP | 0 934 144 B1 | 4/2004 |
| EP | 1 918 084 B1 | 12/2011 |
| EP | B 302 910 B1 | 4/2018 |
| GB | 1 159 963 A | 7/1969 |
| GB | 2 076 728 A | 12/1981 |
| GB | 2 269 149 A | 2/1994 |
| JP | H05-38715 A | 2/1993 |
| JP | H06-91727 A | 4/1994 |
| JP | H10-264157 A | 10/1998 |
| JP | H11-209508 A | 8/1999 |
| JP | 2000-176994 A | 6/2000 |
| JP | 2005-324522 A | 11/2005 |
| TW | 201206671 A | 2/2012 |
| WO | 98/16360 A | 4/1998 |
| WO | 2009/100473 A1 | 8/2009 |
| WO | 2013/052989 A1 | 4/2013 |
| WO | WO-2016191784 A1 * 12/2016 ........... B02C 18/141 |
| WO | 2017/050811 A1 | 3/2017 |

* cited by examiner

PROCESSING PLANT AND METHOD FOR PROCESSING PLASTICS MATERIAL FOR THE RECYCLING THEREOF

CROSS REFERENCE TO RELATED APPLICATIONS

This application is the National Stage of PCT/AT2019/060417 filed on Dec. 6, 2019, which claims priority under 35 U.S.C. § 119 of Austrian Application No. A 51131/2018 filed on Dec. 19, 2018, the disclosure of which is incorporated by reference. The international application under PCT article 21(2) was not published in English.

The invention relates to a method for processing plastic material and a processing plant for plastic material, in particular for processing thermoplastic material for the recycling thereof.

From both WO 98/16360 A and EP 0 934 144 B1 originating therefrom, a generically designed processing device for comminuting, conveying and subsequent plasticizing of thermoplastic material has become known. This processing device comprises a feed device, a processing unit and a plasticizing device adjoining said processing unit. The processing unit in turn comprises a comminuting device, a spirally designed conveying device, a tubularly designed housing, and at least one drive means for the comminuting device and the conveying device. The comminuting device and the spiral conveying device adjoining said comminuting device are accommodated and rotatably mounted in the tubularly designed housing. Moreover, the conveying device defines a first conveying section having a first longitudinal axis. The tubular housing has, in the region of the comminuting device, at least one feed opening open towards the feed device and, in an end region of the first conveying section of the conveying device, a discharge opening arranged on the bottom side. The plasticizing device in turn comprises an extruder screw accommodated in an extruder housing, and a further drive means therefor. The extruder screw has a further conveying section and defines a further longitudinal axis in the further conveying section. In the extruder housing, a fill opening is arranged, wherein the fill opening and the discharge opening arranged in the tubular housing are arranged so as to directly adjoin one another. In the transfer section between the conveying device and the extruder screw, the comminuted plastic material is conveyed either directly from the screw flight of the spiral conveying device or from rotating knives of the part carrying the operating members through the discharge opening into the fill opening and thus into the extruder screw situated below. The first longitudinal axis of the conveying device and the further longitudinal axis of the extruder screw are arranged in the region of the discharge opening and of the fill opening such that they intersect with respect to a projection onto a horizontal plane at an angle of 90°. The direction of circulation of the processing unit is selected so as to correspond to the conveying direction of the extruder screw.

A similar, generically designed processing device has become known from the EP 1 918 084 B1, which is directed toward the geometric design of the transfer region between the conveying device and the extruder screw. Here as well, the first longitudinal axis of the conveying device and the further longitudinal axis of the extruder screw are again arranged in the transition region between the discharge opening and the fill opening such that they intersect at an angle of 90° or at an angle deviating therefrom relative to one another. In this regard, the transfer of the comminuted plastic material from the conveying device to the extruder screw may take place analogously as it has been described before in WO 98/16360 A and/or EP 0 934 144 B1 originating therefrom.

These two known processing devices have proven quite successful, wherein, however, it was not possible to achieve a uniform transfer of the comminuted plastic material to the plasticizing device in all cases of operation. In individual cases, small plastic pieces could collect in the transfer region of the comminuted plastic material between the discharge opening, from the region of the conveying device, and the fill opening, into the plasticizing device, which could lead to the openings becoming smaller or even clogged. Moreover, the amount of plastic discharged and melted per time unit by the plasticizing device could only be increased by increasing the rotational frequency of the drive of the plasticizing device. The possibility to increase the rotational frequency, however, was limited by material degradation due to excessive shearing and by the motor power.

DE 35 25 554 A1 describes another design of a processing device for thermoplastic material. The device has an upright receiving container, wherein a comminuting and mixing tool, which is arranged so as to be rotatable about the container axis, is provided in its bottom region. At the side of and below the receiving container, a screw extruder extending transversely to the container axis is arranged. Moreover, a conveying screw oriented in a parallel direction with respect to the container axis is provided, which conveying screw is arranged in a bag-like extension of the circumferential wall of the receiving container, at the of the comminuting and mixing tool. The conveying screw is arranged so as to freely project in the direction toward the screw extruder and ends, with its free screw end, at a fill opening formed in the housing of the screw extruder. The comminuted plastic material is conveyed into the fill opening by the vertically oriented conveying screw and, after passing through the fill opening, reaches the extruder screw of the screw extruder.

The present invention is based on the object of making the transfer of the comminuted plastic material from the conveying device to the extrusion device more uniform and even more constant, in order to thus minimize or even prevent a collection of plastic material in the transfer region and a resulting clogging of the transfer region. Moreover, however, the output capacity of the amount of plastic ejected per time unit from the extrusion device is also to be increased while maintaining the drive power of the extrusion device.

This object is achieved by a method for processing plastic material and a processing plant for plastic material according to the claims.

The method serves to process plastic material, in particular thermoplastic material for the recycling thereof, by means of a processing plant comprising the following steps:
- providing a feed device, wherein the plastic material to be processed is discharged at the feed device,
- providing a processing unit having
  - a hollow-cylindrically designed housing,
  - a shaft body with a comminuting device arranged or formed on the shaft body and a conveying device adjoining the comminuting device in a conveying direction, the conveying device comprising at least one first screw flight,
  - wherein the shaft body defines a first longitudinal axis,
  - wherein the first screw flight projects beyond the shaft body in a radial direction by a first projection, and the first projection defines a first circular ring surface having an outer first envelope, wherein a ring width of the first circular ring surface corresponds to the first projection,
wherein the conveying device defines a first conveying section in an axial direction of the shaft body,
wherein the shaft body is accommodated in the housing and is rotatably mounted on its first shaft end by means of a first bearing arrangement and on its second shaft end, which is spaced apart from the first in an axial direction, by means of a second bearing arrangement on the housing, and
wherein the housing has, in the region of the comminuting device, at least one feed opening open towards the feed device, and
in this regard, the plastic material to be processed is comminuted by the comminuting device and conveyed along the first conveying section, in the direction toward the second shaft end, by means of the at least one first screw flight of the conveying device,
providing an extrusion device having
an extruder housing,
at least one extruder screw comprising a screw base body and at least one further screw flight,
wherein the at least one further screw flight of the extruder screw defines an outer further envelope,
wherein the extruder screw is accommodated in the extruder housing and defines a further longitudinal axis, and
wherein the at least one extruder screw defines a further conveying section and the extrusion device is arranged behind, when viewed in the conveying direction, the processing unit,
providing a transfer region with a discharge opening out of the housing and a fill opening into the extruder housing, wherein the transfer region is arranged in an end section of the first conveying section of the conveying device, and the first conveying section is flow-connected to the second conveying section in the transfer region,
wherein with respect to a projection onto a horizontal plane, the first longitudinal axis and the further longitudinal axis are oriented such that they intersect in the transfer region, and
wherein, in the transfer region, the plastic material conveyed by the conveying device is transferred to the extrusion device and its at least one extruder screw, and moreover
during its conveying movement along the first conveying section toward the transfer region at least by means of the conveying device, the comminuted plastic material is heated to a transfer temperature with a mean temperature value, wherein the mean temperature value of the transfer temperature is at least in the range of the softening temperature of the plastic material,
the at least one further screw flight of the extruder screw, when viewed in the axial projection direction in the direction of the first longitudinal axis of the shaft body, is arranged such that the at least one further screw flight protrudes, in the direction toward the first longitudinal axis, into the first circular ring surface defined by the first screw flight with its first projection, and
in the transfer region with its transfer temperature, the comminuted plastic material is conveyed, by means of the at least one first screw flight, directly into the further envelope defined by the at least one further screw flight of the extruder screw.

The advantage obtained thereby is that, due to the amount of heat or heat energy additionally introduced by the conveying device along the first conveying section, the previously comminuted plastic material is heated enough, and in this process, is brought up to at least the softening temperature of the respective plastic material, so that it transitions at least partially into a plasticized state. In this selected approach, the provided drive energy of the processing unit is not only used for the comminuting process and the transport movement, but it additionally serves to heat the plastic material to a specific transfer temperature all the way to the transfer region. For the comminuting process, a high nominal power of the drive unit is provided, although it is only actually needed for relatively short periods of time. During the remaining time duration, the redundant remaining drive energy of the drive unit is used for the heating process of the plastic material up to the transfer region. By preheating or temperature-controlling the plastic material at least along the first conveying section, sufficiency can be achieved with a lower drive power of the extrusion device. However, with an equally high drive power of the extrusion device, a higher throughput volume of plastic material per time unit can be achieved.

Because of the direct takeover of the plastic material by means of the extruder screw, the plastic material can be heated to significantly higher temperatures already in the processing unit, without clogging the transfer region. The plastic material is heated at least to a beginning plasticizing and can furthermore also be pro-compacted. This energetically relieves the subsequent extruder screw. The plastic material is compacted more, and less energy is required for further heating the melt in the extrusion unit. Thereby, with a consistent ejection, milder shearing conditions in the extruder are achieved.

Furthermore, the higher temperature of the plastic material also causes a drying of moist material even before the transfer region. The high surface in the conveying device further promotes an efficient heat exchange and makes it possible for water to escape in the direction of the feed device or in the direction of possibly provided openings in the region of the conveying device. Thereby, the energy to be introduced in the extruder is further reduced, also utilizing the better geometric conditions in the conveying device compared to the limited spatial situation of the extruder screw.

Moreover, the arrangement of at least the further screw flight of the extruder screw so as to overlap one another in the projection direction into the first circular ring surface defined by the projection of the first screw flight achieves an even closer together-arrangement of the two intersecting longitudinal axes of the processing unit, in particular of the conveying device, with its shaft body, and the extruder screw. The plastic material supplied or conveyed by the first screw flight of the conveying device is thus conveyed directly into the work area of the extruder screw with its further screw flight, when viewed in the cross-section of the conveying device. This shortens the vertical transfer section in the transfer region due to the preferred arrangement of the intersecting longitudinal axes on top of one another and their angular orientation with respect to one another. Moreover, this achieves a directed forced conveyance of the comminuted plastic material beginning at the first screw flight of the conveying device, directly into the extruder screw and the further or second screw flight arranged thereon. Due to this overlap of the conveying regions formed by the screw flights, it is thus possible to dispense with additional stuffing and/or cutting tools in the transfer region at the end of the conveying device. This furthermore reduces the collection of plastic material in the transfer region from the conveying device toward the extrusion device or prevents it in the first place.

Moreover, an approach is advantageous, in which the temperature value of the transfer temperature of the plastic material corresponds to at least the melting temperature of the plastic material.

A further advantageous approach is characterized in that the temperature value of the transfer temperature of the plastic material is at least 100° C.

A method variant, in which up to 20% of the amount of heat required for heating the plastic material from the input temperature to an output temperature of the plastic material out of the extrusion device is introduced into the plastic material by means of the conveying device, is also advantageous. This way, the ejection amount of the melted plastic material per time unit out of the extrusion device can be increased while maintaining the same energy demand.

A different approach is distinguished by the fact when the heating of the plastic material is carried out on a mechanical basis by means of the rotational movement of the conveying device and its at least one first screw flight. Thus, the rotative rotational movement of the conveying device can also be used for applying the amount of heat or heat energy.

Moreover, an approach is advantageous, in which an additional amount of heat is introduced into and/or an amount of heat is withdrawn from the plastic material during its conveying movement at least along the first conveying section. Thus, an even more targeted temperature progression inside the plastic material to be processed can be achieved up until the transfer region. Thereby, in case of additional energy supply, the energy demand can be lowered at a consistent throughput volume in the extrusion device, or the throughput volume per time unit in the extrusion device can be increased with the same energy input.

However, the object of the invention is also achieved by a processing plant for processing plastic material, in particular for processing thermoplastic material for the recycling thereof.

The processing plant according to the invention serves to process, namely comminute, convey, and subsequently melt thermoplastic material for the recycling thereof. In this regard, the processing plant comprises at least
- a feed device,
- a processing unit having
  - a hollow-cylindrically designed housing,
  - a shaft body with a comminuting device arranged or formed on the shaft body and a conveying device adjoining the comminuting device in a conveying direction, the conveying device comprising at least one first screw flight,
  - wherein the shaft body defines a first longitudinal axis,
  - wherein the first screw flight projects beyond the shaft body in a radial direction by a first projection, and the first projection defines a first circular ring surface having an outer first envelope, wherein a ring width of the first circular ring surface corresponds to the first projection,
  - wherein the conveying device defines a first conveying section in an axial direction of the shaft body,
  - wherein the shaft body is accommodated in the housing and is rotatably mounted on its first shaft end, by means of a first bearing arrangement, and on its second shaft end, which is spaced apart from the first in an axial direction, by means of a second bearing arrangement on the housing, and
  - wherein the housing has, in the region of the comminuting device, at least one feed opening open towards the feed device,
- an extrusion device having
  - an extruder housing,
  - at least one extruder screw comprising a screw base body and at least one further screw flight,
  - wherein the at least one further screw flight of the extruder screw defines an outer further envelope,
  - wherein the extruder screw is accommodated in the extruder housing and defines a further longitudinal axis, and
  - wherein the at least one extruder screw defines a further conveying section and the extrusion device is arranged behind, when viewed in the conveying direction, the processing unit,
- a transfer region with a discharge opening out of the housing and a fill opening into the extruder housing, wherein the transfer region is arranged in an end section of the first conveying section of the conveying device, and the first conveying section is flow-connected to the second conveying section in the transfer region, and
- wherein with respect to a projection onto a horizontal plane, the first longitudinal axis and the further longitudinal axis are oriented such that they intersect in the transfer region, and moreover
- at least the further screw flight of the extruder screw, when viewed in the axial projection direction in the direction of the first longitudinal axis of the shaft body protrudes in the direction toward the first longitudinal axis, into the first circular ring surface defined by the first screw flight with its first projection.

The advantage achieved by this consists in that the arrangement of at least the further screw flight of the extruder screw so as to overlap one another in the projection direction into the first circular ring surface defined by the projection of the first screw flight achieves an even closer together-arrangement of the two intersecting longitudinal axes of the processing unit, in particular of the conveying device, with its shaft body, and the extruder screw. The plastic material supplied or conveyed by the first screw flight of the conveying device is conveyed directly into the work area of the extruder screw with its further screw flight, when viewed in the cross-section of the conveying device. This shortens the vertical transfer section in the transfer region due to the preferred arrangement of the intersecting longitudinal axes on top of one another and their angular orientation with respect to one another. Moreover, this achieves a directed forced conveyance of the comminuted plastic material beginning at the first screw flight of the conveying device, directly into the extruder screw and the further or second screw flight arranged thereon. Due to this overlap of the conveying regions, it is thus possible to dispense with additional stuffing and/or cutting tools in the transfer region at the end of the conveying device. This furthermore reduces the collection of plastic material in the transfer region from the conveying device toward the extrusion device or prevents it in the first place.

Moreover, it may be advantageous if a portion of the screw base body of the extruder screw protrudes into the first circular ring surface defined by the first projection of the first screw flight. This allows achieving an even better takeover and a more even filling degree of the extruder screw with the previously comminuted plastic material conveyed there.

A different embodiment is distinguished by the fact that a carrier tube is provided, on which carrier tube the first screw flight is arranged or formed, and the carrier tube is arranged on the shaft body and is connected in a torque-proof manner to the shaft body to form an assembly unit. Thereby, different operating conditions may be quickly taken into consideration. Furthermore, a replacement of worn out components can thus be performed more easily, without having to replace the entire shaft body in doing so.

A further possible embodiment has the features that the outer further envelope of the further screw flight of the extruder screw is arranged immediately adjacent to the shaft body of the processing unit. Thus, the two longitudinal axes of the conveying device and of the extrusion device may be arranged at the smallest possible distance to one another. Due to the immediate, adjacent arrangement of the further screw flight with its further outer envelope defined by it, collisions between the extruder screw and the shaft body of the processing unit can be avoided.

A further embodiment provides that the first screw flight ends, when viewed in the direction of the first longitudinal axis, before the outer further envelope defined by the further screw flight. With this, it is achieved that in the transfer region, the first screw flight of the conveying device does not collide with the outer circumferential region of the extruder screw with its further screw flight.

A different embodiment is distinguished by the fact that a guide element is provided, which guide element is arranged on the shaft body in an axial direction, on that side of the conveying device which faces away from the comminuting device and the cross-section of which guide element, viewed in an axial section, is designed to be slightly smaller in its section facing the extruder screw than the outer further envelope defined by the further screw flight. Arranging the guide element on the opposite side of the conveying device with respect to the extruder screw thus allows an even more directed takeover of the conveyed plastic material into the receiving region of the extruder screw. Additionally, however, a sealing of the interior of the housing toward the second bearing arrangement can be achieved thereby.

A further preferred embodiment is characterized in that a recess is provided in the shaft body, which recess is formed continuously across the circumference of the shaft body and the cross-section of which recess, viewed in an axial section, is designed to be slightly greater in the section facing the extruder screw than the outer further envelope defined by the further screw flight. By arranging or forming an additional recess in the shaft body, the two intersecting longitudinal axes of the processing unit, in particular of its shaft body, and of the extruder screw can be arranged in the transfer region in an even better position overlapping one another with the conveying region formed by the first screw flight.

It may be advantageous if a temperature-control device is provided, which is arranged or formed on and/or in the housing and/or in the shaft body, wherein by means of the temperature-control device, an amount of heat may be introduced into and/or withdrawn from the plastic material at least along the first conveying section. Thus, an even more targeted temperature progression inside the plastic material to be processed can be achieved up until the transfer region. Thereby, in case of an energy supply, the energy demand can be lowered at a consistent throughput volume in the extrusion device, or the throughput volume per time unit in the extrusion device can be increased with the same energy input.

For the purpose of better understanding of the invention, it will be elucidated in more detail by means of the figures below.

Figure 2:
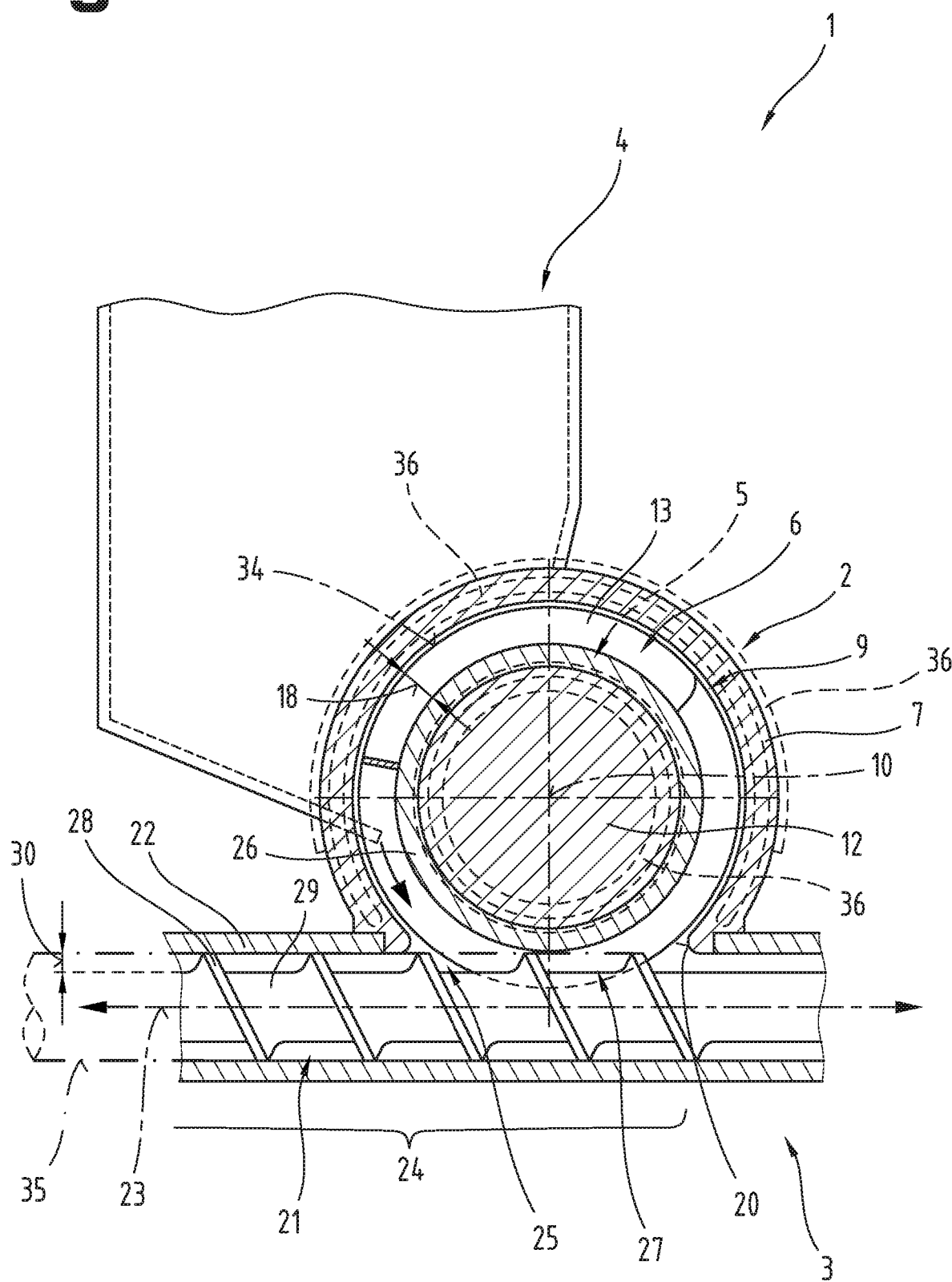
Figure 3:
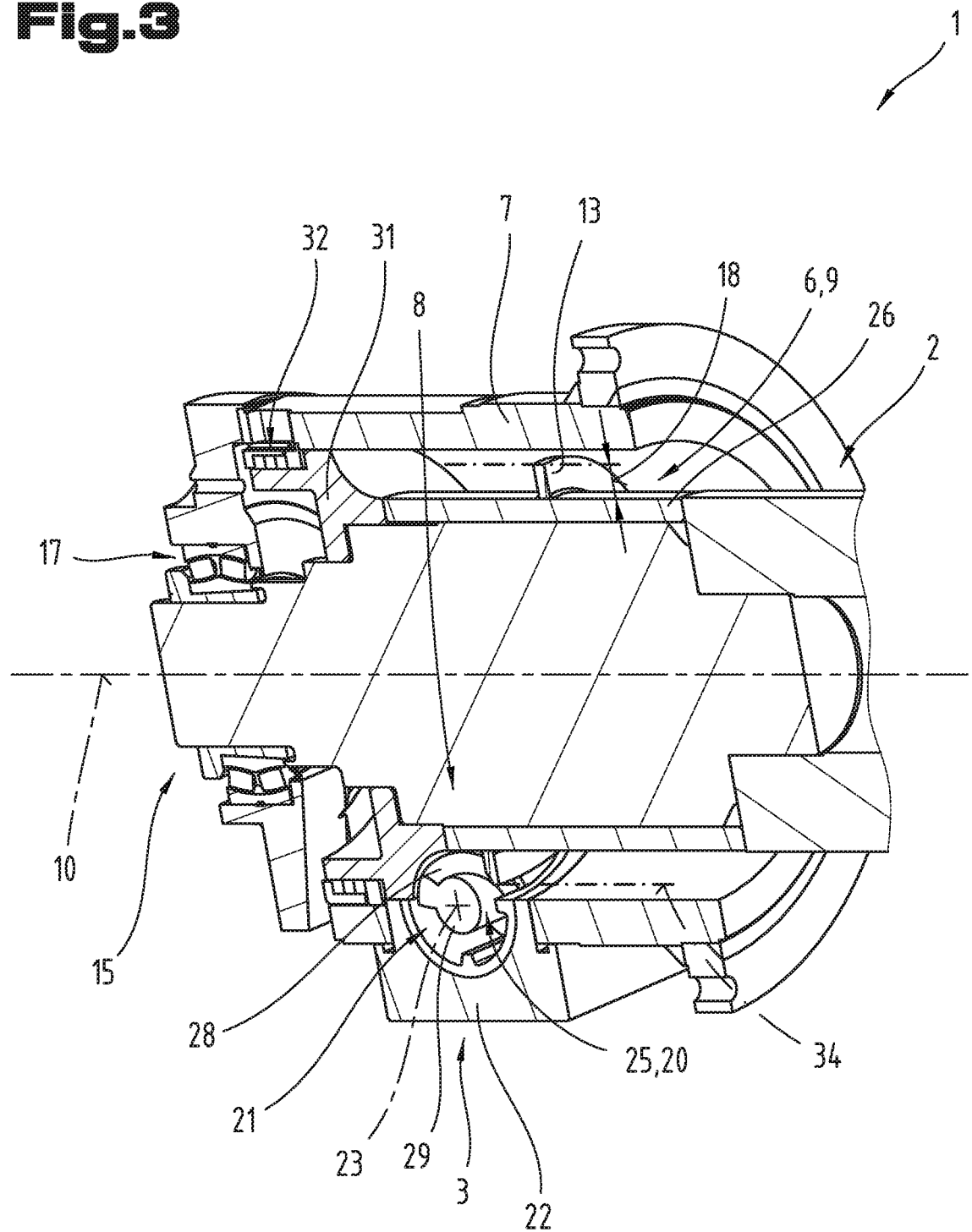

These show in a respectively very simplified schematic representation:

FIG. 1 a partial section of a processing plant in an axial vertical section through the processing unit;

FIG. 2 a radial section through the conveying device of the processing unit in the transfer region to the extrusion device, according to lines II-II in FIG. 1;

FIG. 3 A further possible embodiment of the processing plant in the transfer region in an axial vertical section through the processing unit and graphic depiction.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "particularly/in particular" is hereinafter understood such that it may refer to a possible, more specific embodiment and more detailed specification of a subject matter or a method step, but does not necessarily have to represent an obligatory, preferred embodiment of the latter or an approach.

FIGS. 1 and 2 show, in a simplified manner and only in portions, a processing plant 1 for plastic material, in particular for processing thermoplastic material for the recycling thereof. FIG. 3 also shows the processing plant 1, although with possible additional exemplary embodiments. The processing plant 1 is in most cases installed on a flat, preferably horizontally oriented contact surface such as a hall floor.

Generally, such a processing plant 1 serves to first comminute the plastic material, which often has a larger dimension or a large volume, in a processing plant 2 to a correspondingly small piece size into piece goods having a size suitable for further processing and to subsequently melt it in an extrusion device 3. The plastic material to be comminuted may be formed of larger piece goods in various different dimensions and sizes, films, strips, or also already pre-comminuted partial piece goods. The melt stream melted by the extrusion device 3 and emerging therefrom or the emerging melt streams may, after their shaping, be cooled and granulated for later processing. Independently thereof or in addition thereto, however, it would also be possible to feed the melted plastic material into a directly following further handling and/or a corresponding shaping. The immediately following shaping can take place in a continuous or a discontinuous extrusion process or an injection molding process, wherein here, the amount of heat still contained in the melt does not have to be withdrawn and re-introduced later. An additional processing, purification or addition of aggregates is also possible in this regard.

In most cases, a feed device 4 is arranged upstream of the processing unit 2, which feed device 4 serves, in the known manner, to collect the plastic material to be handled and/or processed and to direct it to the processing unit 2. In this regard, the feeding may take place automatically by means of self-weight and/or by means of an additional input device, which moves the plastic material not yet comminuted toward the processing unit 2. In most cases, a feed duct is used for receiving the plastic material to be handled and/or processed, by which feed duct the forwarding to the processing unit 2 is carried out.

The processing unit 2 may comprise a comminuting device 5 and a conveying device 6, wherein preferably, the comminuting device 5 and/or the conveying device 6 is and/or are accommodated in a preferably tubularly or hollow-cylindrically designed housing 7 and rotatably mounted therein. The mostly rotary drive can be carried out by means of at least one first drive means not specified further, such as an electric motor, possibly with interposition of a transmission or the like. The conveying device 6 serves to convey the plastic material previously comminuted in the comminuting device 5 in the conveying direction according to the depicted arrow on to a transfer region 8 which is described in more detail below. In the transfer region 8, the plastic material having a piece size that can be further handled is transferred from the conveying device 6 to the subsequently arranged extrusion device 3. The transfer region 8 is arranged on that side of the conveying device 6 which faces away from the comminuting device 5 and thus forms the end of the conveying path of the processing unit 2. The preferably spirally designed conveying device 6 is arranged downstream of the comminuting device 5 when viewed in the conveying direction. Moreover, the conveying device 6 forms a first conveying section 9 and also defines a first longitudinal axis 10. In the region of the first conveying section 9 the conveying direction is illustrated by means of an arrow, wherein the further transport takes place in the axial direction. The first conveying section 9 immediately follows, when viewed in the conveying direction, a comminuting section 11 defined by the comminuting device 5. When the contact surface is oriented horizontally, the first longitudinal axis 10 has an orientation that runs preferably in parallel thereto. Thus, the first longitudinal axis 10 has a lying, horizontal orientation.

In most cases, at least the conveying device 6 and possibly also the comminuting device 5 is formed by a central shaft body 12 and/or they are formed or arranged on the shaft body 12. Additionally, at least one spirally or windingly designed first screw flight 13 for forming the conveying device 6 is provided at the outer circumference of the shaft body 12. The circumferential longitudinal extension of the first screw flight 13 may also be referred to as helical or screwlike. The comminuting device 5 may also be formed by cutting blades, which are not specified further and which are arranged or formed on the shaft body 12. The shaft body 12 in turn may also have a tubular design and be supported in its interior on a bearing axis and/or be rotatably mounted thereon. The previously described first drive means is drive-connected to the shaft body 12.

In the present exemplary embodiment, the shaft body 12 is preferably formed so as to extend continuously over the comminuting section 11 and the conveying section 9. In this regard, the shaft body 12 may be configured as a single-piece component or be composed of multiple shaft body parts connected to each other. For the sake of simplicity, it is referred to in its entirety as shaft body 12. On each of the two shaft ends, namely a first shaft end 14 and a second shaft end 15, spaced apart from one another in the axial direction, one first bearing arrangement 16 and one second bearing arrangement 17 located opposite therefrom are provided. The first bearing arrangement 16 is arranged at the beginning of the comminuting section 11 and the end of the shaft body 12 that is located on the left here, and the second bearing arrangement 17 is arranged on the end of the shaft body 12 that is located on the right here. This allows creating a stable, double-shear mounting of the shaft body 12. Accommodating and supporting the respective bearing units of the bearing arrangements 16, 17 with the bearing or the bearings can take place in the housing 7 or housing parts of the processing plant 1.

It would also be possible to not arrange or form the first screw flight 13 for forming the conveying device 6 directly on the shaft body 12 but rather on a sleeve or on a carrier tube 26 and to arrange this unit on a shaft body 12 and to hold it in a torque-proof manner thereon. This variant is shown in a section of the depiction of FIG. 3. In this case, the shaft body 12, the carrier tube 26 and the first screw flight 13 form an assembly unit. In this embodiment variant, the carrier tube 26 as an intermediate piece forms a component of the shaft body 12 and constitutes the outer circumferential delimitation of the shaft body 12.

The configuration of the processing unit 2 with its comminuting device 5 as well as its conveying device 6 may be selected, e.g. as it is described in more detail in EP 0 934 144 B1. Hence, in order to avoid unnecessary repetitions, that description is pointed out and referred to.

The preferably spirally or windingly designed first screw flight 13 of the conveying device 6 in this exemplary embodiment can be formed either so as to be continuous over the longitudinal extension and/or so as to be interrupted over the longitudinal extension. Moreover, the first screw flight 13, when viewed in a radial direction, projects beyond the shaft body 12 or the carrier tube 26 by a first projection 18. The first projection 18 is calculated from the difference of the dimension (of the outer diameter) of an outer first envelope 34 of the first screw flight 13 minus the outer diameter of the shaft body 12 or the carrier tube 26 in the region of the first conveying section 9, divided by two. The respective dimensions are in each case determined in a plane oriented in a normal orientation with respect to the first longitudinal axis 10. The first projection 18 moreover defines a ring width of a first circular ring surface, wherein its center is located in the first longitudinal axis 10.

The clear cross-section of the hollow-cylindrically designed housing 7 is preferably formed as a circular surface. The outer dimension (the outer diameter) of the first screw flight 13 is selected to be slightly smaller than the clear cross-section of the interior of the housing 7. In the region of the comminuting device 5, in most cases there is also at least one feed opening 19 open towards the feed device 4 arranged or formed in the housing 7, through which feed opening 19 the plastic material can reach the comminuting device 5.

For transferring the comminuted plastic material from the processing unit 2, in particular the conveying device 6, toward the extrusion device 3, at least one discharge opening 20 is provided in an end region or an end section of the first conveying section 9 of the conveying device 6 in the transfer region 8. In this exemplary embodiment, the at least one discharge opening 20 is arranged on the bottom side in the housing 7. However, it would also be possible to arrange the discharge opening 20 above and/or on the side of the conveying device 6 in the housing 7. The respective position and/or arrangement of the at least one discharge opening 20 is to be selected depending on the arrangement of the extrusion device 3 arranged downstream.

The extrusion device 3 may have at least one extruder screw 21, which is accommodated and rotatably mounted in an extruder housing 22 and can be put into a rotatory motion about a further longitudinal axis 23 by means of a further drive means that is also not further specified. The at least one further drive means is drive-connected to the at least one extruder screw 21.

The at least one extruder screw 21 in turn defines the further longitudinal axis 23 as well as a further and/or second conveying section 24. At least one fill opening 25 is provided in the extruder housing 22 for taking over the comminuted plastic material. When the contact surface is oriented horizontally, the further longitudinal axis 23 also has an orientation that runs preferably in parallel thereto. Thus, the further longitudinal axis 23 also has a lying, horizontal orientation. With respect to a projection onto a horizontal plane, the first longitudinal axis 10 and the further longitudinal axis 23 are oriented so as to intersect in the transfer region 8. The enclosed intersecting angle between the two longitudinal axes 10, 23 can be selected randomly. In most cases or preferably, it is 90°. However, the intersecting angle may also be an acute angle or an obtuse angle.

In this exemplary embodiment shown here, the discharge opening 20 arranged in the hollow-cylindrical housing 7 and the fill opening 25 arranged in the extruder housing 22 are arranged so as to immediately adjoin one another and together form a transfer opening 27. As here, the discharge opening 20 is arranged on the bottom side and the extrusion device 3 with its extruder screw 21 is arranged below the housing 7, the two openings 20, 25 are above one another and in a position preferably overlapping one another. In this regard, it is essential that the two openings 20, 25 are connected to each other in terms of flow for the transfer and forwarding of the comminuted plastic material, and hence a further transport of the plastic material to be processed from the first conveying section 9 of the conveying device 6 to the further or second conveying section 24 of the extrusion device 3 is possible. This transition is preferably to be formed in a sealed manner.

The extruder screw 21 comprises at its outer circumference at least one further or second screw flight 28, which is arranged or formed on a screw base body 29, as is best evident in FIG. 2. The further or second screw flight 28, when viewed in a radial direction, also projects past or beyond the screw base body 29 by a further or second projection 30.

The further or second projection 30 is calculated from the difference of the dimension (of the outer diameter) of an outer second or outer further envelope 35 of the further or second screw flight 28 minus the outer diameter of the screw base body 29 in the region of the further or second conveying section 24, divided by two. The further or second projection 30 also defines a ring width of a further or second circular ring surface, wherein its center is arranged in the second longitudinal axis 23.

In the transfer region 8, the first longitudinal axis 10 of the processing unit 2, which is defined by the shaft body 12, and the further or second longitudinal axis 23 are arranged so as to intersect. In this context, it should be noted that the pitch directions (left-hand or right-hand) of the conveying device 6 and also in the extruder screw 21 can be selected freely. It is also possible to select directions of rotation (clockwise, counterclockwise) of the conveying device 6 and/or of the extruder screw 21 depending on the respective pitch direction. It should always be ensured that a further conveyance of the comminuted plastic material in the conveying direction starting from the conveying device 6 into the transfer region 8 and further into the extrusion device 3 takes place safely. In the transfer region 8, a direction of circulation (direction of rotation) of the conveying device 6 with respect to the conveying direction of the extruder screw 21 may be selected, which is oriented either in the same direction of circulation (direction of rotation) or in the opposite direction of circulation (direction of rotation) thereto. The direction of rotation and the pitch direction of the conveying device 6 is to be selected depending on the arrangement and design of the comminuting device 5 with its cooperative cutting elements.

Moreover, it is provided here that, in the transfer region 8, the further screw flight 28 projecting beyond the screw base body 29 protrudes into the first projection 18 defined by the first screw flight 13 in case of an axial projection viewed in the direction of the first longitudinal axis 10 of the processing unit 2, in particular its shaft body 12. The convergence of the extruder screw 21 with its outer further envelope 35 around the further or second screw flight 28 can take place at least in so far that the outer further envelope 35 is arranged immediately neighboring the shaft body 12 or the carrier tube 26.

In order to avoid a collision of the first screw flight 13 of the conveying device 6 with the extruder screw 21 and the further or second screw flight 28 located thereon, the first screw flight 13 ends, when viewed in the axial direction of the first longitudinal axis 10, preferably immediately before the outer further envelope 35 defined by the further or second screw flight 28.

Due to the protrusion at least of the further or the second screw flight 28 and possibly also of one portion of the screw base body 29 into the first circular ring surface defined by the first projection 18 of the first screw flight 13 beyond the circumference, it is thus possible, if the shaft body 12 is mounted on both sides on its two shaft ends 14, 15, which are spaced apart from one another in the axial direction, for the plastic material conveyed from the first screw flight 13 into the transfer region 8 to be conveyed directly into the work area of the extruder screw 21 with the further or second screw flight 28 located thereon. Hence, the transfer and the further transport in the transfer region 8 becomes even safer and a clogging or relocating of the transfer opening 27 in the region between the two housings 7, 22 can be nearly or even entirely prevented.

As now shown in FIG. 3 as a further possible, possibly separate or independent embodiment variant, a guide element 31 may also be provided in the transfer region 8 starting from the conveying device 6 through to the extrusion device 3. The guide element 31 is designed as a ring body and is arranged on the shaft body 12 and/or the carrier tube 26. A torque-proof connection to the shaft body 12 and/or the carrier tube 26 can be provided but does not have to be. When viewed in the axial direction, the guide element 31 is arranged on the shaft body 12, on that side of the conveying device 6, which faces away from the comminuting device 5, and thus located in the region of the second shaft end 15 and hence facing the second bearing arrangement 17. Moreover, the guide element 31 is located on the side facing away from the conveying device 6 when viewed with respect to the cross-section of the extruder screw 21.

A cross-section of the guide element 31 in the axial section with respect to the first longitudinal axis 10 is designed to be slightly smaller in its section facing the extruder screw 21 than the outer further envelope 35 defined by the further screw flight 28. Between the guide element 31 and the interior of the housing 7, a sealing arrangement 32 may also be provided in order to be able to reduce or prevent in the first place a passage of plastic material toward the second bearing arrangement 17. This way, depending on the selected direction of rotation or selected direction of circulation of the extruder screw 21, an even better takeover into the extrusion device 3 can be achieved. The guide element 31 therefore has a fillet in its portion facing the extruder screw 21 when viewed in the axial section, the radius of which fillet is slightly greater than a radius of the outer further envelope 35 of the further screw flight 28.

For achieving an even closer arrangement of the two longitudinal axes 10, 23 and to reduce the distance in there intersection area, it would also be possible in addition to or independently of the above, to provide or form a recess 33 in the surface of the shaft body 12. This can take place given a sufficient strength of the shaft body 12 so as to not weaken it too much. The cross-section of the circumferential recess is to be adapted to the cross-section of the outer further envelope 35 of the further or the second screw flight 28.

In the axial section through the first longitudinal axis 10, the recess 33 has a concave curvature, wherein a radius of the recess is slightly greater than a radius of the outer further envelope 35 defined by the further screw flight 28 in the same plane. In order to be able to carry out an unhindered rotational movement of the feed device 4, in particular its shaft body 12, the recess 33 is to be formed as a continuous, groove-shaped recess over the circumference. This previously described embodiment variant having the recess 33 is adumbrated with a dashed line in FIG. 1, on that side of the shaft body 12, which is opposite the extrusion device 3.

The two envelopes 34, 35, each of which is defined by the outer front face of the respective screw flight 13, 28, are imagined cylindrical surfaces, whose center is located in the respective longitudinal axis 10, 23, and whose cross-section is in each case located in a plane oriented in a normal direction with respect to the longitudinal axis 10, 23. The further envelope 35 of the further screw flight 28 of the extruder screw 21 may also be referred to as second envelope 35. With regard to the two previously described circular ring surfaces, whose ring width is defined either by the first projection 18 or by the further and/or the second projection 30, the envelopes 34, 35 are each arranged so as to extend around the outer circumference of the respective circular ring surface. Accordingly, the circular ring surface, which is defined by the first projection 18, is referred to as first circular ring surface. This circular ring surface defined by the further or the second projection 30 is referred to here as further or second circular ring surface.

However, the previously described processing plant 1 also serves to carry out a course of the method for processing thermoplastic material for the recycling thereof. In this regard, the thermoplastic material to be processed is discharged at the feed device 4 and is comminuted in the processing unit 2 by means of the comminuting device 5 and conveyed along the first conveying section 9 into the transfer region 8, by means of the conveying device 6, which is situated so as to adjoin said comminuting device 5, with its at least one first screw flight 13. In the transfer region 8, the plastic material conveyed there by the conveying device 6 is transferred directly to the extrusion device 3 and its at least one extrusion device 21.

In this regard, it is additionally provided that during its conveying movement along the first conveying section 9 toward the transfer region 8 at least by means of the conveying device 6, the comminuted plastic material is heated to a transfer temperature with a mean temperature value, which falls at least into the range of the softening temperature of the respective plastic material. Individual parts of the plastic material may already be partially melted, so that this temperature value also corresponds to the start of the plasticization of the plastic material. In this regard, the transfer temperature is understood to be that temperature or a temperature range in predefined limits, at which or in which, in the transfer region 8, the plastic material preheated by the conveying device 6 is transferred to the subsequently situated extrusion device 3.

In plastic handling or plastic treatment, plasticizing is understood to be the conversion of plastics, in particular having a comminuted piece size, by means of introducing temperature and/or pressure. This often takes place by means of friction, in particular internal friction. In this case, the viscosity of the heated plastic material is reduced or lowered.

This amount of heat or heat energy introduced in the course of the conveying movement of the plastic material does not need to be generated anymore in the subsequent extrusion device 3 by the same. The heated plastic material therefore has the transfer temperature with a mean temperature value in the transfer region 8, which mean temperature value is at least in the range of the softening temperature of the plastic material. The mean temperature value of the softening temperature may be specified e.g. by means of the Vicat softening temperature (VST) or be determined by means of this method. In the subsequently arranged extrusion device 3, the plastic material is processed further by means of the extrusion screw 21. The extrusion device 3 may also be referred to as processing device, as melting device or as plasticizing device.

However, in the transfer region, the plastic material may also have a transfer temperature with a temperature value, at which the melting temperature of the plastic material is already reached. Furthermore, a possible temperature value of the plastic material in the transfer region may be, for example at least 100° C. This, however, only applies to plastics, which do not decompose at such temperatures.

At the beginning of the processing operation and the associated filling of the feed device 4 with the plastic material to be comminuted, said plastic material has a particular input temperature, in most cases the ambient temperature. The transfer temperature has a higher temperature value relative thereto. The final melting and treatment operation of the plastic material takes place in the extrusion device 3, wherein said plastic material is discharged by the extrusion device 3 having an output temperature.

Preferably, up to 20% of the amount of heat required for heating the plastic material from the input temperature to the output temperature of the plastic material out of the extrusion device 3 can be introduced into the plastic material by means of the conveying device 6. The amount of heat can also be referred to as enthalpy. The plastic material is heated by means of the rotational movement of the conveying device 6 and its at least one first screw flight 13 on a mechanical basis. The previously mentioned output temperature of the plastic material out of the extrusion device 3 is that temperature and/or that temperature value, to which the plastic material has been heated during its passage in the extruder by the processing operation that took place therein and which the plastic material has directly in the discharge region out of the extrusion device 3.

Moreover, it can be provided that an additional amount of heat is introduced into and/or an amount of heat is withdrawn from the plastic material during its conveying movement at least along the first conveying section 9. This may take place, for example by means of a temperature-control device 36, which is arranged or formed on and/or in the housing 7. Independently thereof or in addition thereto, it is also possible to arrange the temperature-control device 36 in the shaft body 12 or to form it therein. This allows carrying out an even more targeted temperature control for the plastic material to be passed through. These possibilities are adumbrated in FIG. 2. To provide a better overview, the representation of supply lines was refrained from. This creates the possibility to add an additional amount of heat to the plastic material situated inside the housing 7. However, the temperature-control device 36 could also serve to withdraw a certain proportion of the amount of heat already contained in the plastic material from the plastic material situated inside the housing 7 and to thus cool it. However, a combination and/or an arrangement in a row of heating zones and cooling zones by means of the temperature-control device 36 at least along the first conveying section 9 would also be conceivable.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers | |
|---|---|
| 1 | processing plant |
| 2 | processing unit |
| 3 | extrusion device |
| 4 | feed device |
| 5 | comminuting device |
| 6 | conveying device |
| 7 | housing |
| 8 | transfer region |
| 9 | first conveying section |
| 10 | first longitudinal axis |
| 11 | comminuting section |
| 12 | shaft body |
| 13 | first screw flight |
| 14 | first shaft end |
| 15 | second shaft end |
| 16 | first bearing arrangement |
| 17 | second bearing arrangement |
| 18 | first projection |
| 19 | feed opening |
| 20 | discharge opening |
| 21 | extruder screw |
| 22 | extruder housing |
| 23 | further longitudinal axis |
| 24 | further conveying section |
| 25 | fill opening |
| 26 | carrier tube |
| 27 | transfer opening |
| 28 | further screw flight |

| List of reference numbers | |
|---|---|
| 29 | screw base body |
| 30 | further projection |
| 31 | guide element |
| 32 | sealing arrangement |
| 33 | recess |
| 34 | first envelope |
| 35 | further envelope |
| 36 | temperature-control device |

The invention claimed is:

1. A processing plant (1) for processing thermoplastic material for the recycling thereof, comprising
a feed device (4),
a processing unit (2) having
a hollow-cylindrically designed housing (7),
a shaft body (12) with a comminuting device (5) arranged or formed on the shaft body (12) and a conveying device (6) adjoining the comminuting device (5) in a conveying direction, the conveying device (6) comprising at least one first screw flight (13),
wherein the shaft body (12) defines a first longitudinal axis (10),
wherein the first screw flight (13) projects beyond the shaft body (12) in a radial direction by a first projection (18), and the first projection (18) defines a first circular ring surface having an outer first envelope (34), wherein a ring width of the first circular ring surface corresponds to the first projection (18),
wherein the conveying device (6) defines a first conveying section (9) in an axial direction of the shaft body (12),
wherein the shaft body (12) is accommodated in the housing (7) and is rotatably mounted on its first shaft end (14), by means of a first bearing arrangement (16), and on its second shaft end (15), which is spaced apart from the first shaft end in an axial direction, by means of a second bearing arrangement (17) on the housing (7), and
wherein the housing (7) has, in a region of the comminuting device (5), at least one feed opening (19) open towards the feed device (4),
an extrusion device (3) having
an extruder housing (22),
at least one extruder screw (21) comprising a screw base body (29) and at least one further screw flight (28),
wherein the at least one further screw flight (28) of the extruder screw (21) defines an outer further envelope (35),
wherein the extruder screw (21) is accommodated in the extruder housing (22) and defines a further longitudinal axis (23), and
wherein the at least one extruder screw (21) defines a second conveying section (24) and the extrusion device (3) is arranged behind, when viewed in the conveying direction, the processing unit (2),
a transfer region (8) with a discharge opening (20) out of the housing (7) and a fill opening (25) into the extruder housing (22), wherein the transfer region (8) is arranged in an end section of the first conveying section (9) of the conveying device (6), and the first conveying section (9) is flow-connected to the second conveying section (24) in the transfer region (8), and
a recess (33) in the shaft body (12), wherein the recess (33) is formed continuously across a circumference of the shaft body (12) and has a cross-section viewed in an axial section, designed to be slightly greater in a section facing the extruder screw (21) than the outer further envelope (35) defined by the further screw flight (28), wherein, with respect to a projection onto a horizontal plane, the first longitudinal axis (10) and the further longitudinal axis (23) are oriented such that they intersect in the transfer region (8), wherein at least the further screw flight (28) of the extruder screw (21), when viewed in an axial projection direction toward the first longitudinal axis (10) of the shaft body (12) protrudes toward the first longitudinal axis (10), into the first circular ring surface defined by the first screw flight (13) with its first projection (18), wherein the first screw flight (13) ends, when viewed in a direction of the first longitudinal axis (10), before the outer further envelope (35) defined by the further screw flight (28), and wherein a portion of the screw base body (29) of the extruder screw (21) protrudes into the first circular ring surface defined by the first projection (18) of the first screw flight (13).

2. The processing plant (1) according to claim 1 wherein a carrier tube (26) is provided, on which carrier tube (26) the first screw flight (13) is arranged or formed, and the carrier tube (26) is arranged on the shaft body (12) and is connected in a torque-proof manner to the shaft body (12) to form an assembly unit.

3. The processing plant (1) according to claim 1 wherein the outer further envelope (35) of the further screw flight (28) of the extruder screw (21) is arranged so as to immediately border the shaft body (12) of the processing unit (2).

4. The processing plant (1) according to claim 1, further comprising a guide element (31) is arranged on the shaft body (12) in an axial direction, on that side of the conveying device (6) which faces away from the comminuting device (5), wherein the guide element (31) has a cross-section, viewed in an axial section, designed to be slightly smaller in a section facing the extruder screw (21) than the outer further envelope (35) defined by the further screw flight (28).

5. The processing plant (1) according to claim 1, further comprising a temperature-control device (36) arranged or formed on and/or in the housing (7) and/or in the shaft body (12), wherein by means of the temperature-control device (36), an amount of heat may be introduced into and/or withdrawn from the plastic material at least along the first conveying section (9).

\* \* \* \* \*